April 26, 1960  R. E. THOMPSON  2,933,948
SELECTOR DEVICE FOR AUTOMATIC TRANSMISSION
Filed Sept. 24, 1956

INVENTOR.
Reynold E. Thompson
BY Mueller & Aichele
Attys.

United States Patent Office 2,933,948
Patented Apr. 26, 1960

2,933,948

SELECTOR DEVICE FOR AUTOMATIC TRANSMISSION

Reynald E. Thompson, Mount Prospect, Ill., assignor to Motorola, Inc., Chicago, Ill., a corporation of Illinois Application September 24, 1956, Serial No. 611,583

4 Claims. (Cl. 74—483)

This invention relates to new and useful improvements in positioning devices, and more particularly to a selector device for an automatic transmission for an automobile, in which there are provided a plurality of key slides which are movable to set an actuating lever in a position corresponding to a desired setting, with the actuation of any one key slide releasing the key slide which was previously actuated.

In the development of the modern automobile, there has developed a considerable demand for fully automatic transmissions in which the automobile is provided automatically with a desired gear setting according to the setting of a selector mechanism mounted on the steering wheel or on the dashboard. Automatic transmissions which are now in use generally include drive gear, low gear, reverse gear, and neutral gear settings. If the transmission is set in the drive gear setting, the automobile will start out in low gear and automatically shift through an intermediate gear setting into high gear upon reaching a predetermined speed. If it is desired to operate the automobile in low gear or in reverse gear, the selector mechanism must be set at the appropriate gear setting. The neutral gear setting is generally used during idling and during the starting of the motor. A similar arrangement of gear settings is used in automobiles which use a variable speed torque converter. In the past, the selector mechanisms which have been used have consisted of a lever mounted on the steering wheel post which is movable to any of the desired settings of the transmission and which actuate the cable for adjusting the setting of the transmission in accordance with the position of the transmission control lever.

There has recently developed a demand for the elimination of the automatic transmission selector lever from the steering-wheel post and substitution of a simple pushbutton device on the steering-wheel post or on the dashboard which will select a desired gear setting upon the depression of a pushbutton which is marked for the desired setting.

It is therefore one object of this invention to provide a new and improved selector device for automobile automatic transmissions in which the desired gear setting of the transmission is selected by depression of a pushbutton actuator.

Another object of this invention is to provide an improved control device having pushbutton actuators in which the actuation of any one actuator releases and resets the previously actuated actuator.

A feature of this invention is the provision of a positioning device having a lever which is actuated to any one of a plurality of control positions by the coaction of a V-shaped cam surface on a movable slide member with a laterally extending crank arm on the lever to locate the lever in a predetermined position and to return from an actuated position a previously actuated slide member.

Another feature of this invention is the provision of a positioning device having a bell crank lever which is movable to any one of a plurality of control positions by the co-action of laterally movable slide members with a crank arm on the lever, and having a latch means for holding any of the slide members in an actuated position and releasable upon movement of another one of the slide members to position the bell crank lever at a new control position.

Other objects and features of this invention will become apparent from time to time throughout the specification and claims as hereinafter related.

In the accompanying drawings, to be taken as a part of this specification, there is clearly and fully illustrated a preferred embodiment of this invention, in which drawings.

This invention comprises a new and improved selector device of general application, but which is especially adapted for the control of automatic transmissions in automobiles. In this selector device, there is provided a bell crank control lever which is adapted for connection to the control cable of an automatic transmission. The control lever has a crank arm portion extending laterally outward therefrom which is arranged for actuation by any one of a plurality of key slides which correspond to the desired setting of the automatic transmission. The key slides each have a V-shaped cam surface which is engageable with a crank arm portion of the lever upon lateral movement of the slide to position the lever in a selected position. There is also provided a latch means in the form of a latch bar which will retain any one of the key slides in an actuated position. The movement of any other key slide will establish a new position for the actuator lever and will release the latch bar to cause the previously actuated key slide to be returned to its original position.

Figure 1:
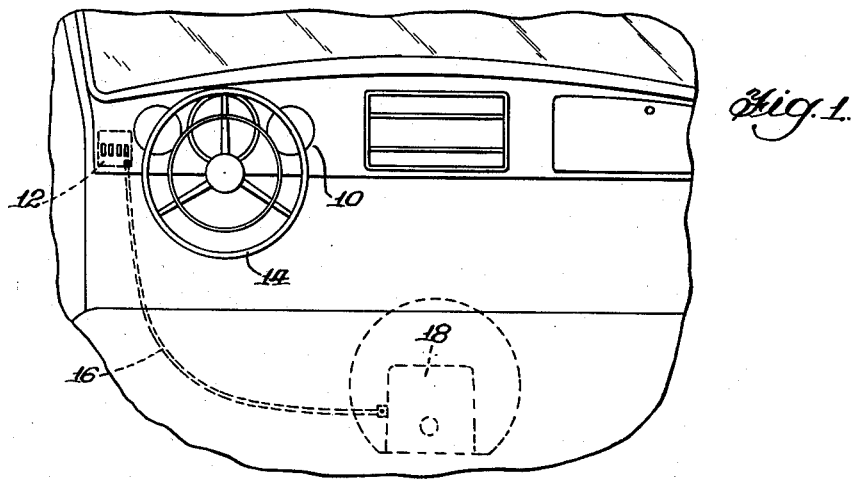
Fig. 1 is a view of a dashboard of an automobile showing a gear selector on the dashboard having pushbuttons for desired settings and showing in dotted lines the cable connection to an automatic transmission which is actuated thereby.

In Fig. 1 there is shown a conventional automobile dashboard having a plurality of instruments 10 located thereon and showing a transmission selector box or positioning device 12 located to the left of the steering-wheel 14. The transmission selector box 12 could be located elsewhere on the dashboard or could even be located on the steering-wheel post if desired. A dotted connection 16 is shown extending from the transmission control 12 to the automatic transmission 18, with the connection 16 being a control cable which actuates an automatic transmission 18 of conventional design. Most automatic transmissions in use today have four gear settings. There are usually provided settings for driving and low forward gear speeds, and for one reverse gear speed and a neutral gear setting. The selector device 12 is shown and described as having four settings of the type just mentioned. It should be noted, however, that this selector device could easily be altered to provide for additional forward or reverse gear settings or for a parking gear setting as is provided on some automobiles.

The selector device 12 comprises a box-shaped casing 20 having side walls 22 and 24 and end walls 26 and 28 respectively. A bell crank lever 30 is positioned within the casing 20 and connected to the casing wall 22 by a bolt or rivet 32 and spaced therefrom by a bearing washer 34. The bell crank lever 30 has a lever arm 36 which is connected as at 37 to the transmission control cable 16. At the other end of the bell crank lever 30 there is secured a crank arm 38 which extends laterally outward therefrom and which has its outer end secured to one end of a lever 40 which is pivotally connected as by bolt or rivet 42 and bearing washer 44 to the other wall 24 of the casing 20.

The end wall 26 of the casing 20 is provided with a plurality of guide slots 46. The end wall 28 is similarly provided with a plurality of guide slots 48 which are aligned with the guide slots 46. Positioned within the casing 20 are a plurality of key slides 50, 52, 54 and 56, which are equal in number to the number of gear positions required for the automatic transmission. The key slides have projections 58 at one end which extend through the slots 46 and projections 60 at their other end which extend through the slots 48, so that each key slide is guided for longitudinal movement within the casing 20. The projections 60 are each provided with pushbuttons 61. The key slides 50, 52, 54 and 56 are provided with cut out portions forming V-shaped cams 62, 64, 66 and 68, respectively. Each cam is oriented differently with respect to the crank arm 38, as illustrated by the orientation of cam portions 66 and 68 shown in Fig. 3. The lever crank arm 38 extends through the cam portions 62, 64, 66, 68, and has roller sleeve members 70, 72, 74 and 76, positioned thereon for engagement with the edge of the cam portions 62, 64, 66 and 68, respectively. The key slides 50, 52, 54, 56, each have a notch 78 in the bottom edge thereof which is engageable with the rebent end portion 81 of a latch member 80. The latch member 80 is pivotally connected as at 82 to the walls 22 and 24 of the casing 20. The latch member 80 has a pair of springs 84 connected to the walls 22 and 24 respectively, which urge the end portion 81 toward engagement with the notch 78 on the respective key slides. The key slides 50, 52, 54 and 56 are provided with springs 86, 88, 90 and 92, respectively, which are positioned around the projections 58 and urge the key slides to the right as viewed in Figs. 2 and 3. When the key slides are positioned to the right of the casing in their unlatched position, they engage rubber bumper members 96 which are provided to reduce the amount of noise produced upon actuation of this selector device.

*Operation*

Figure 2:
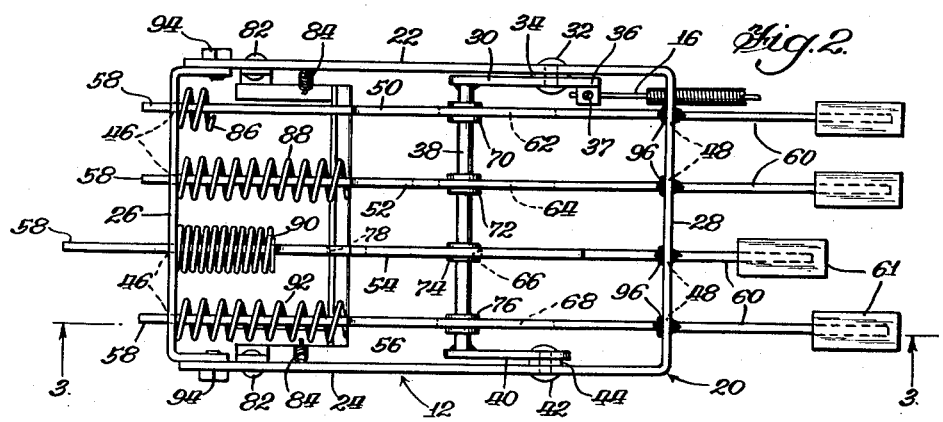
Fig. 2 is a plan view of this selector device showing one of the slide members in an actuated position and holding the control lever in a predetermined position.
Figure 3:
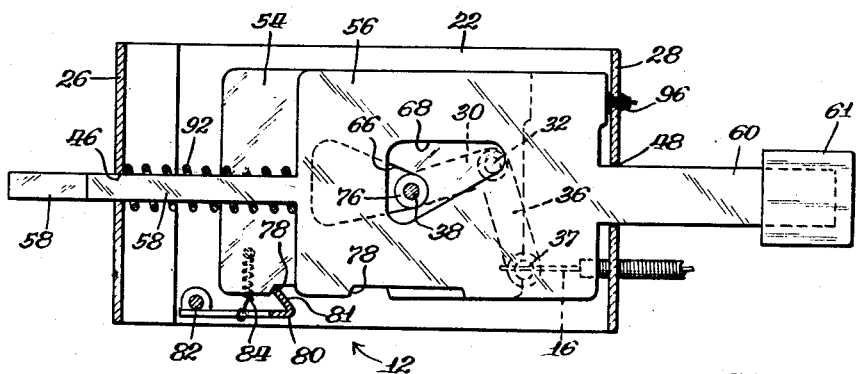
Fig. 3 is a sectional view taken along the line 3—3 of Fig. 2, showing the relation of the key slide members to the actuator lever.

The operation of the automatic transmission 18 for the automobile is determined by the position of the cable 16 which is in turn determined by the setting of the bell crank lever 30. When one of the key slides 54 is moved to an actuated position, as shown in Figs. 2 and 3, its V-shaped cam portion engages the roller bearing member 74 and locates solely by cam action the crank arm 38 and the bell crank lever 30 in a selected position. While located in this position the key slide 54 is secured against movement by the engagement of the latch 80 with the notch 78 in the lower edge thereof. When it is desired to change the gear setting of the transmission, another one of the key slides, such as slide 56, is moved to establish a new position for the crank arm 38 and the bell crank lever 30. With the movement of the slide 56 to the left (as viewed in Figs. 2 and 3) the lower edge of the slide engages the rebent portion 81 of the latch member 80 and moves the same downward to disengage the latch from the notch 78 in the key slide 54. When the latch is thus disengaged the spring 90 moves the key slide 54 to a disengaged position at the extreme right of the casing 20. The key slide 54 will engage the rubber bumper 96 which is provided to prevent excessive noise on actuation of this device. Further movement of the key slide 56 to the left causes the latch 80 to engage the notch 78 in the lower edge thereof and hold the key slide 56 in an actuated position. In this position the roller 76 is held in a selected position as determined by the location of the vertex or corner of the V of the cam portion 68 in the key slide 56, and thereby establishing a new position for the crank arm 38 and the bell crank level 30. It is thus apparent that the actuation of any one of the key slides will cause the latch 80 to release the key slide which has been previously actuated, and will establish solely by cam action a new position for the crank arm 38 and bell crank lever 30 as determined by the engagement and orientation of the V-shaped cam portion of the key slide with the roller bearing on the crank arm 38.

I claim:

1. A selector device for an automatic transmission for an automobile which is controlled by movement of a control cable to a plurality of control positions corresponding to forward, reverse, and neutral gear positions; which device includes a lever member adapted to be connected to the control cable and mounted for pivotal movement, a crank arm on said lever, a plurality of spaced movable members corresponding in number to the gear positions and movable laterally of said crank arm, said movable members each including means having an opening therein positioned about said crank arm and engageable with said crank arm, said openings having different triangular shapes with oriented vertices for moving said crank arm upon predetermined movement of said movable members to position said crank arm by positive cam action of said triangular shapes and retain said crank arm in said oriented vertices thereof at different predetermined positions corresponding to desired control positions of the transmission control cable, with said predetermined positions of said crank arm being spaced in an arc substantially perpendicular to the direction of movement of said members, latch means engageable with each of said movable members upon said predetermined movement to secure the same in operative engagement with said crank arm, and said movable members each being operable upon predetermined movement to move said crank arm and said lever to a new position and having a portion cooperable with said latch means to release the same from engagement with a previously latched movable member.

2. A selector device for an automatic transmission for an automobile which is controlled by movement of a control cable to a plurality of control positions corresponding to forward, reverse, and neutral gear positions; which device includes a lever member adapted to be connected to the control cable and mounted for pivotal movement, a crank arm on said lever, a plurality of spaced movable members corresponding in number to the gear positions and movable laterally of said crank arm, said movable members respectively having differently shaped V-cam portions with vertices oriented differently with respect to said crank arm and being laterally spaced along said crank arm, spring means biasing said movable members to an initial disengaged position, said movable members each being operable upon predetermined movement to move said V-shaped cam portion thereof into engagement with said crank and move the same by cam action from any predetermined position to another predetermined position determined by the orientation of the vertex thereof and corresponding to a predetermined control position of the transmission control cable, with said predetermined positions being spaced with respect to each other in an arc substantially perpendicular to the direction perpendicular to the direction of movement of said members, latch means engageable with each of said movable members upon said predetermined movement to secure the same in operative engagement with said crank arm, and said movable members each being operable upon predetermined movement to move said crank arm and said lever to a new position and having a portion engageable with said latch means to release the previously latched movable member for movement to its position.

3. A selector device for an automatic transmission for an automobile which is controlled by movement of a control cable to a plurality of control positions corresponding to forward, reverse, and neutral gear positions; which device includes a box-shaped casing having side walls and slotted end walls, a bell crank lever pivotally mounted on one of the side walls of said casing and having a first lever arm adapted to be connected to the control cable for determining the position thereof, having a second lever arm with a crank arm supported thereon and extending across said casing, a plurality of spaced slide members corresponding in number to the gear positions of the automatic transmission, said slide members having parallel extending flat portions and projections on opposite ends supported in the slotted end walls of said casing for slidable movement longitudinally of said casing, said flat portions of said slide members respectively having differently shaped V-cam portions engageable with said crank arm and with respective vertices therein each differently oriented with respect to said crank arm to determine the position thereof, spring means urging each of said slide members to an initial disengaged position, each of said V-shaped cam portions being engageable with said crank arm upon predetermined movement of the respective slide members to position solely by positive cam action and retain in said vertices said crank arm and said lever at a predetermined position corresponding to a predetermined control position for the transmission control cable, with said predetermined positions of said crank arm being spaced from each other in an arc substantially perpendicular to the direction of movement of said slide member, each of said slide members having a latching notch in the base portion thereof, a latch bar pivotally mounted on the side walls of said casing and having a rebent end portion engageable with the notches of said slide members, spring means urging said latch bar into engagement with said slide members, said latch bar being operable upon predetermined movement of any one of said slide members to engage the notch thereof to hold the same with the V-shaped cam portion in operative engagement with the lever crank arm, each of said slide members being engageable with said rebent end of said latch bar upon predetermined movement to move the same out of latching engagement with the latching notch of the previously latched slide member, and the predetermined movement of any one of said slide members establishing a new position for said crank arm and said lever and releasing the previously latched slide member for movement by said spring means to its initial disengaged position.

4. A positioning device including in combination, a lever, a crank arm on said lever, a plurality of movable flat key slides each having a V-shaped cam portion engageable with said crank arm and with said slides being positioned parallel to each other and spaced along said crank arm, a vertex of each of said V-shaped cam portions being oriented differently with respect to said crank arm, said movable slides being operable upon predetermined movement to engage solely by means of said cam portion thereof and retain in said vertex thereof said crank arm at different selected positions spaced in an arc substantially perpendicular to the direction of movement of said slides, and with the different selected positions of said crank arm being determined by the respective orientation of the vertices of said V-shaped cams, latch means engageable with each of said movable slides upon predetermined movement thereof to secure the same in operative engagement with said crank arm, and said movable slides each being engageable with said latch means to release the same from engagement with a previously actuated movable slide upon movement thereof for establishing a new position for said crank arm and said lever.

References Cited in the file of this patent
UNITED STATES PATENTS

| | | |
|---|---|---|
| 2,251,464 | Neracher et al. | Aug. 5, 1941 |
| 2,253,433 | Kellogg | Aug. 19, 1941 |
| 2,340,393 | Leishman | Feb. 1, 1944 |
| 2,518,825 | Simpson | Aug. 15, 1950 |